United States Patent [19]

Cortés

[11] 4,169,318

[45] Oct. 2, 1979

[54] APPARATUS FOR THE PREPARATION OF EYEGLASS LENSES, PRIOR TO THE SHAPING AND/OR BEVELLING THEREOF

[75] Inventor: Antonio C. Cortés, Hospitalet de Llobregat, Spain

[73] Assignee: Proptis, S.A., Spain

[21] Appl. No.: 841,440

[22] Filed: Oct. 12, 1977

[30] Foreign Application Priority Data

| | | | |
|---|---|---|---|
| Oct. 23, 1976 | [ES] | Spain | 223.977 |
| Jun. 8, 1977 | [ES] | Spain | 229.141 |

[51] Int. Cl.[2] .......................... G01B 1/00; G02C 7/02

[52] U.S. Cl. ................................ 33/174 A; 33/180 R

[58] Field of Search ...................... 33/180 R, 189, 200, 33/174 A; 51/216 LP, 284 R, 217 L

[56] References Cited

U.S. PATENT DOCUMENTS

| | | | |
|---|---|---|---|
| 2,803,884 | 8/1957 | Polley | 33/174 A |
| 2,917,971 | 12/1959 | Goddu et al. | 33/174 A |
| 3,049,766 | 8/1962 | Buckminster | 33/174 A |
| 3,368,285 | 2/1968 | Buckminster et al. | 33/174 A |

*Primary Examiner*—Willis Little

*Attorney, Agent, or Firm*—Staas & Halsey

[57] ABSTRACT

Apparatus for holding a lens to define the relative positions of the optical and geometrical centers. The apparatus is provided with means for applying a reference mark to the lens or affixing a holding member allowing the shaping and/or bevelling operations for adapting the lens to an eyeglass frame in optimum conditions.

7 Claims, 11 Drawing Figures

APPARATUS FOR THE PREPARATION OF EYEGLASS LENSES, PRIOR TO THE SHAPING AND/OR BEVELLING THEREOF

FIELD OF THE INVENTION

The present invention relates to an apparatus for the preparation of lenses of eyeglasses, prior to their shaping and/or bevelling. Such preparation consists of marking the lens or the attachment of a holding member thereto, thereby allowing all the stages of said shaping and/or bevelling operation to be performed on the primitive lens to be effected under the best conditions.

It is known that machines for shaping and/or bevelling lens for their adaptation to the corresponding eyeglass frame have a split shaft, one half having a holding terminal and the other having a flexible terminal, as well as knuckle joint means to improve the fitting of the flexible terminal, particularly when the faces of the lens are not parallel. The shaft clamps the lens in place by axial pressure, at the same time as it causes it to rotate and such rotation is braked to a variable extent by the action of the grindstones work on the lens irregularly, according to the shape of the template and the offsetting from the geometric centre and the optical centre. The braking effect of the grindstones is at times applied sharply and it may change the chosen, preset position of the lens, producing a faulty lens which has to be rejected. This makes production more expensive, a situation which is particularly worsened when working on multifocal lens.

It is, therefore, desirable to prepare the lens particularly with respect to the reference marking for the bevelling operation and/or application of holding members to the lens enabling the lens to be handled during such operations. All depends on the lens dimensions, on the shape of the frame, on the diameter of the primitive lens, on the separation between the wearer's pupils, on the geometric centre of the rings of the eyeglass frame and, even, on the possibility of the lens being bi- or multifocal.

As is known, one stage of the preparation of lenses for the above purposes consists, alternatively, of: (a) applying a moulded mass of low melting point metal, for example one of a range of alloys melting at temperatures of below 100° C., to a precise point on the surface of the lens, such mass sticking to the lens and forming a holding means, or (b) applying a suction pad having a metal or plastics terminal and capable of forming a holding element, such element being suitable for assembly, as in the previous case, in the bevelling machine, or (c) marking two axes or other references on the lens for the positioning of some special clips allowing the lens to be correctly located in the bevelling machine.

The apparatus of the invention comprises the conditions recognised in the various lens preparation systems referred to above and provides the optician with further advantages, such as easy centering of the lens, checking and selection of the lens diameter with the aid of the bevelling machine template and others. On the other hand, the corresponding holding member is attached tangentially to the outer surface of the lens, namely, its axis is normal to the surface of the lens in the point of incidence thereon.

It also allows a metal block to be applied to the lens as holding member. One of the faces of the block is concave, with a radius of curvature close to that of the lens, the block being attached to the lens through a ring member having adhesive on both sides and which is inserted between the block and the lens.

SUMMARY OF THE INVENTION

The apparatus according to the invention comprises, a body, a cavity in the upper horizontal surface of said body, an annular member adapted to be located in said cavity and capable of rocking in any direction, said annular member having at least three arms adapted for supporting a lens extending from the upper surface thereof, means for directing a concentrated light beam through the cavity, an upright column attached to said body, an arm mounted for up and down movement to said upright column and having an aperture over said cavity, three bosses extending from the lower face thereof and disposed, preferably, as the apexes of an equilateral triangle, said bosses being adapted to hold the lens together with the arms of the annular member, a spring urging said arm in a downward direction, means for lifting said arm against the urging of said spring, a transparent plate supported by said arm and capable of rotation around said upright column, said plate having a fine reticle, preferably with millimeter divisions, means mounted to the arm and to the plate suitable for ensuring a particular relative position between the two, an upright support column and a guide post attached to said body, interchangeable means for the applications of a holding member or mark to a lens.

A further feature of the invention is that the interchangeable means for the application of a holding member or mark to the lens is constituted by an arm having a ring at one end for mounting on the support column, a bushing in the centre for receiving the guide post and means at the other end for housing or forming the holding member or for effecting the marking, said arm being of such a length that when its ring is located on the support column and its bushing is received on the guide post, the other end thereof is located vertically over the point of the lens where the holding member or mark is to be applied.

BRIEF DESCRIPTION OF THE DRAWINGS

Other objects and features of the invention will be disclosed in detail in the following description to be read with reference to the accompanying drawings, in which.

DETAILED DESCRIPTION OF THE PREFERRED EMBODIMENT

Figure 1:
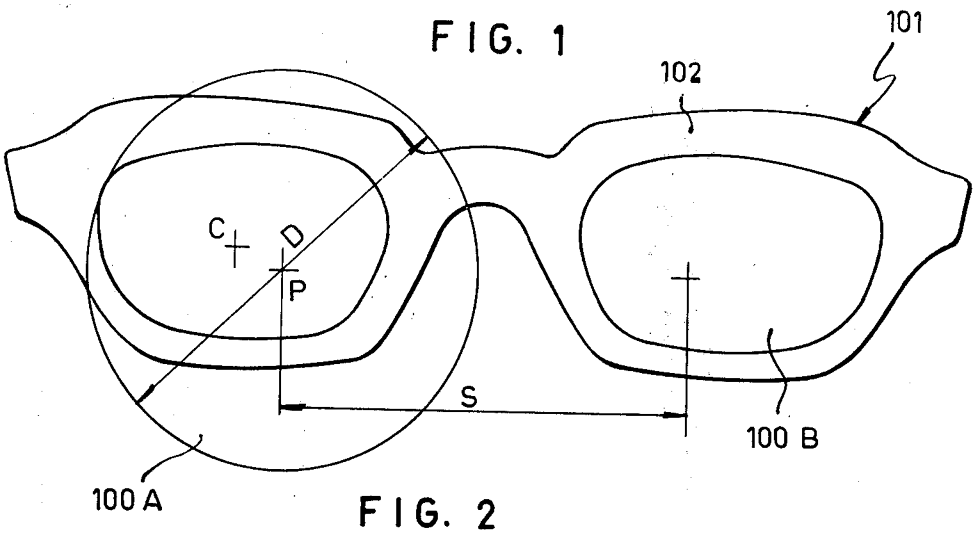
FIG. 1 is a diagrammatic view showing the relative relationship of a lens in its primitive form to the corresponding eyeglass frame.

The inventive eyeglass lens preparing apparatus comprises a body 1, supported by blocks 2 and wherein there is housed a lamp 3, a mirror 4, a glass 5, preferably coloured green to provide eyesight relaxing properties to the light beam, and an optical condenser 6.

Figure 4:
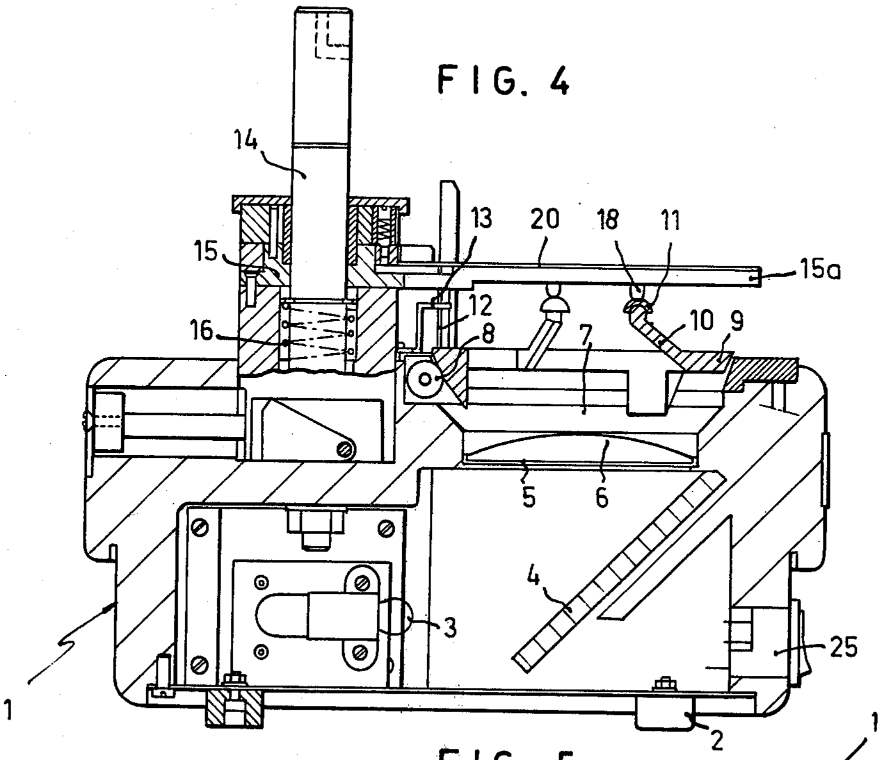
FIG. 4 is a sectional view of the apparatus on the line IV—IV of FIG. 5.
Figure 5:
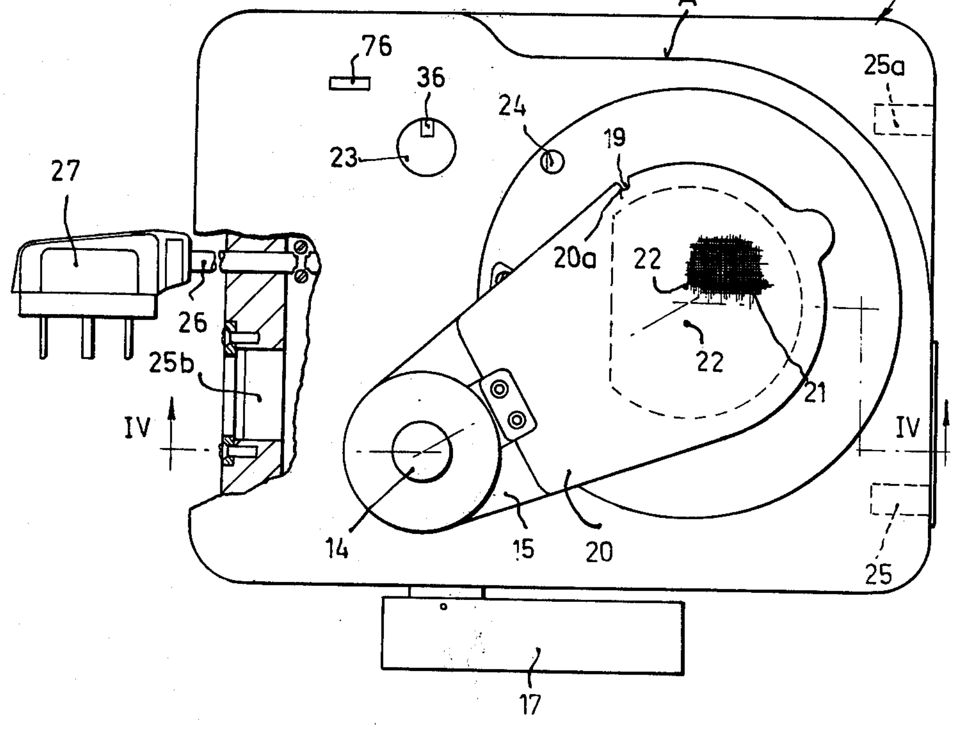
FIG. 5 is a plan view of the apparatus of the invention, when not fitted with any of the lens preparing means.
Figure 6:
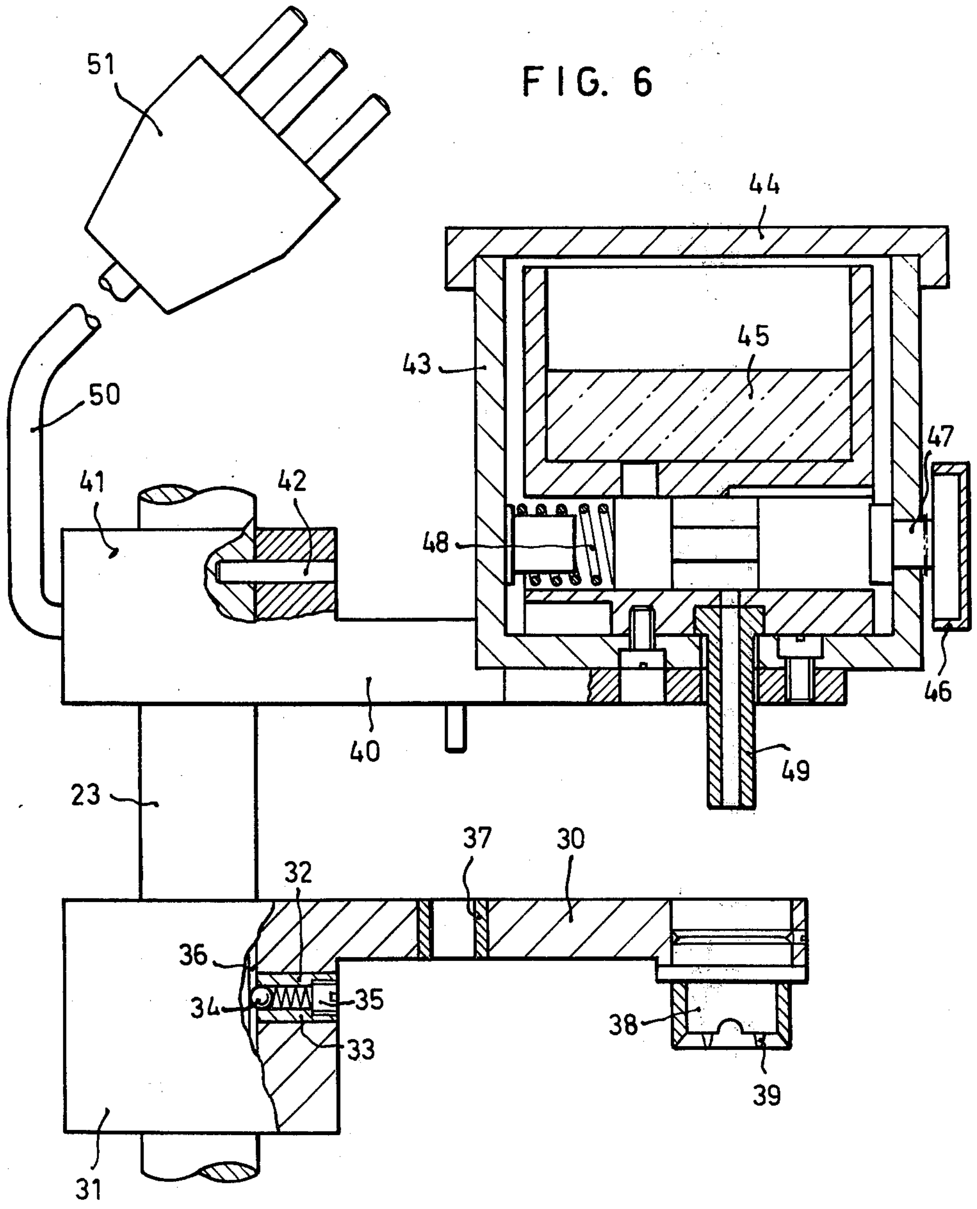
FIG. 6 is an elevation view, partly in section, of the means for forming the alloy lens holding member.
Figure 7:
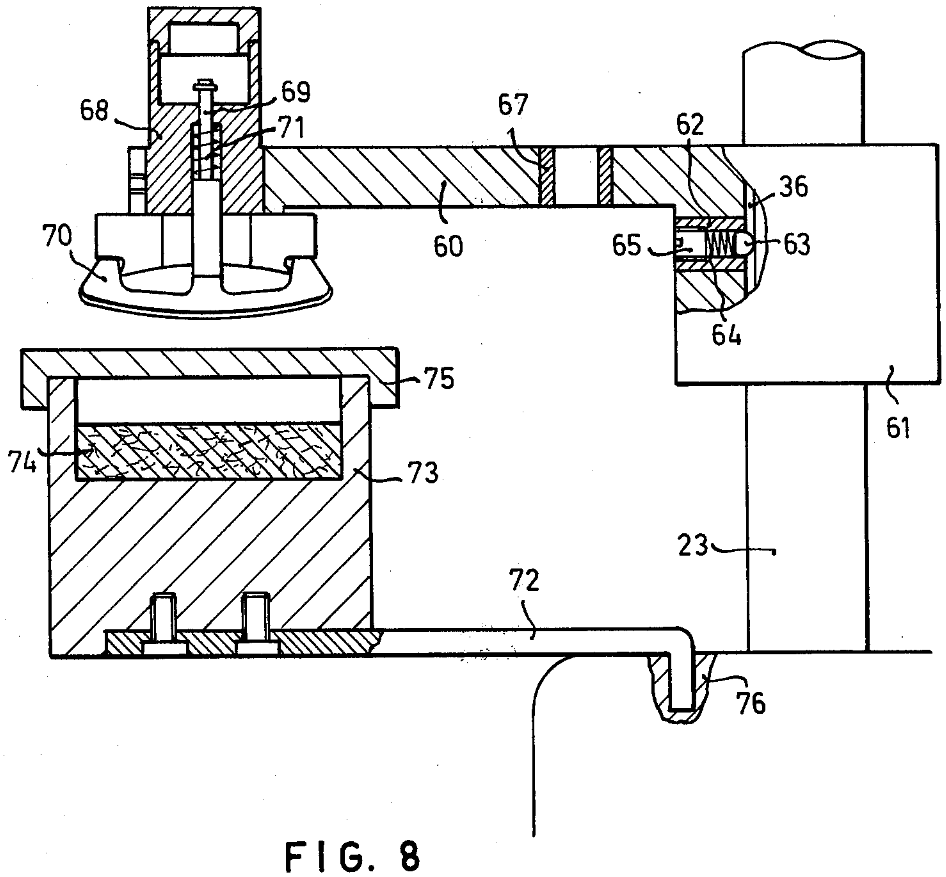
FIG. 7 is a similar view of the lens marking means.
Figure 8:
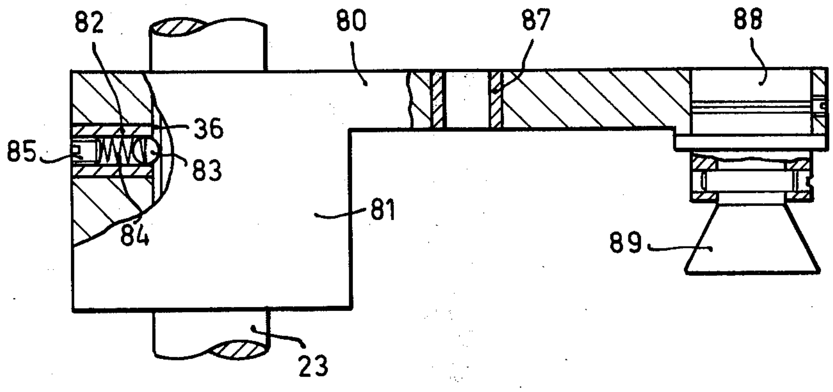
FIG. 8 is also a similar view of the means for applying the suction member to the lens.
Figure 9:
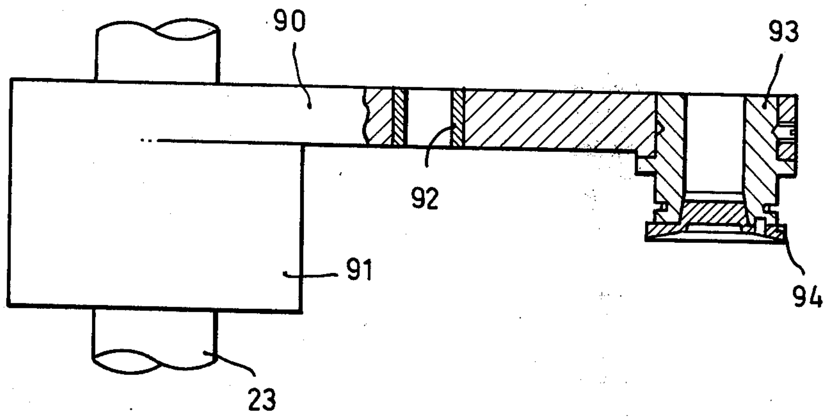
FIG. 9 is a similar view of the means for applying a metal holding member without prior melting.

Correspondingly above the optical condenser 6 there is a cavity 7, in the lateral surface of which there are mounted rollers 8. Preferably there are three rollers, one of which only is illustrated in FIG. 4. Bearing against said rollers there is an annular member 9, the side wall of which forms substantially a part of a sphere. As a result of this, the annular member may rock in any direction while its side wall remains always in contact with the rollers 8. Said annular member has three arms 10 extending from the upper surface thereof and capped with respective protection members 11 made from a resilient material. The annular member 9 is also provided with a rod 12, guided by a fork 13 attached to the body 1, said rod preventing excessive rocking of said annular member 9.

The body 1 is also provided with a column 14 to which there is mounted non-rotatably, but vertically movable, an arm 15. Said arm 15 is urged to its lowermost position by a spring 16 and may be raised by a conventional mechanism, not shown in the drawings, operated through the side handle 17. A blade 15*a* of said arm 15 has a central aperture vertically matching said cavity 7 and is provided on the under side thereof with three bosses 18 corresponding to the apexes of an equilateral triangle. The blade 15*a* is provided with a pin 19 on the upper surface thereof.

Bearing against the upper surface of arm 15 there is a transparent plate 20 which accompanies said arm 15 in the vertical movements thereof. Said plate is adapted to rotate around column 14 and is provided with a small notch 20*a* which, on engagement with the pin 19 of arm 15, determines the correct working position of the plate 20 which covers the whole of the blade 15*a*. The plate is also provided with reticle 21, preferably having millimeter divisions, and small bosses 22.

The body 1 is also provided with an upright support column 23 for supporting the means to be described hereinafter and a guide post 24. A switch 25 drives the electrical circuit, which is fed through a cable 26 having a plug 27, feeding current to the lamp 3. A further switch 25*a* is provided for a purpose to be described hereinafter.

The means for moulding the lens holding member in the form of a mass of metal alloy comprises an arm 30 having a ring 31 for support on the support column 23, said ring being provided with a positioning means formed by a bushing 32, spring 33, ball 34 and cap 35, which engages with a groove 36 of said column 23. Said arm 30 is also provided with a bushing 37 for centering the arm on being received over the guide post 24, and a member 38 in the form of a silicone rubber mould, making it adaptable to all lenses, and provided on its lower surface with bearing bosses 39 for engagement with the lens. A further metering arm 40 is provided with a ring 41 for support on the column 23, said ring being provided with a pin 42 sliding in a groove in the column. At the end of the arm there is a container 43 with cover 44, for containing a low melting point alloy 45. Said alloy is heated by an electric heating element regulated by a thermostat (not shown). A pushbutton 46, with shaft 47 and spring 48, enables a metered amount of the alloy to be fed through a tube 49 towards the said mould 38. A cable 50 provided with a plug 51 allows the electrical circuit to be fed from a socket 25*b*, housed in body 1 and controlled by switch 25*a*.

A lens marking means comprises an arm 60 having a ring 61 mounted on the column 23 and provided with a positioning means formed by a bushing 62, ball 63, spring 64, and cap 65, engageable in groove 36 of the column. Said arm 60 is provided with a centering bushing 67, similar to bushing 37 of arm 30 and, at the end thereof, with a member 68 allowing a pin 69 connected to a rubber stamp 70 to slide against the urging of a spring 71. Said stamp 70 enables the marking of the lenses by adapting itself to any lens curvature. A further arm 72 supports a cup 73 carrying a pad or felt 74 impregnated with ink for the stamp 70 and provided with a cover 75. One end of arm 72 is housed in an aperture 76 of the body 1.

The suction cup device mounting means comprises an arm 80 having a ring 81 mounted to column 23 and provided with a positioning means formed by a bushing 82, ball 83, spring 84 and cap 85, engaged in groove 36 of said column 23. Said arm 80 is also provided with a centering bushing 87 similar to bushings 37 and 67 and at the end thereof has a member 88 for supporting a suction cup means 89.

Figure 10:
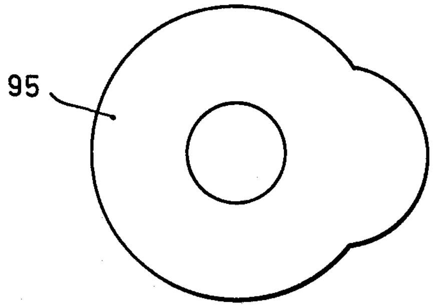
FIG. 10 is a plan view of the adhesive rubber ring member for attaching the metal holding member to the lens.
Figure 11:
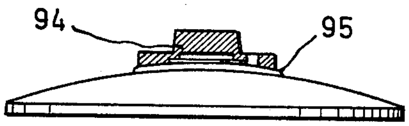
FIG. 11 illustrates a lens with the adhesive member and metal holding member attached thereto.

The means adapted for providing a lens with a metal holding member without having to cast one in each case comprises an arm 90 with ring 91, adapted likewise for mounting to the column 23, said ring having a positioning means, not shown, similar to the means constituted by members 32, 33, 34 and 35 in ring 31 of arm 30. Arm 90 has a centering bushing 92, similar to bushes 37, 67 and 87, and is provided at the end with a member 93 adapted for releasably holding block 94 which may be affixed to a lens as shown in FIG. 11 by means of an adhesive ring member 95 (FIG. 10).

The operation of the apparatus of the invention is as follows: The chosen lens 100A has had its centre P (FIG. 1) previously marked and, according to the shape of the front portion 102 of the eyeglass frame 101, the position of the wearer's pupil and the interpupilar distance S are calculated from tables and calculations referred to the position of point C, which is to be used as the centre of rotation for the lens at the time of shaping and/or bevelling in the bevelling machine. It is evident that it is in point C where, by way of the present machine, the marking or the holding means required for the subsequent bevelling operation in the corresponding machine have to coincide.

Arm 15 is caused to move upwardly on column 14 by operating handle 17, to make it possible to locate the lens to be prepared on the ends of arms 10 of the annular member 9. When the arm is then caused to lower, the lens is held between its lower bosses 18 and arms 10 under the action of spring 16 urging arm 15 downwardly. The current is switched on through switch 25 and the correct illumination of the lens by way of the lamp 3, mirror 4, glass 5 and optical condenser 6 is obtained.

Figure 2:
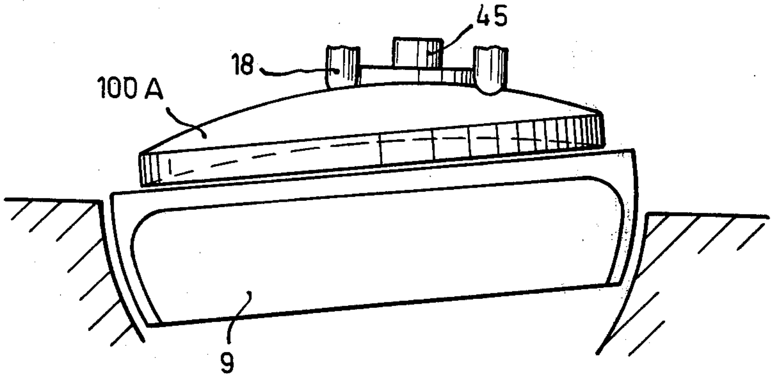
FIG. 2 is a schematic view of the location of a lens in the apparatus of the invention.

Plate 20 is set to its correct position relative to blade 15*a* of arm 15 by engaging pin 19 in notch 20*a*. Then the centre of the millimeter reticle 21 is made to coincide with the centre P of the lens and then the lens is moved by hand until its centre P is located relative to the centre of the reticle in the same way as it is to point C in FIG. 1. At this time, due to the shape of the annular member 9, the lens is located in such a way that point C is in the uppermost position possible, after the fashion of a pole of the spherical surface of the lens, lying on the centre of the equilateral triangle formed by the three lower bosses 18 and, therefore, in the exact position to be worked on by the means of the apparatus for marking it or attaching thereto a holding member for the subsequent shaping and/or bevelling operation, which member (FIG. 2) therefore incides normally to the lens at that point.

A template matching the final form required of the lens according to the shape of the eyeglass frame is laid over the plate 20 and rests on the small bosses 22 thereof which are inserted in appropriate holes of the template. In this way it is possible to check whether the diameter D of the chosen lens is sufficient or whether a larger diameter lens is to be used.

Thereafter the plate 20 is rotated to one side to leave free access to the lens through the three bosses 18 and apply the holding member or marking. For operation of the marking means, after mounting ring 61 to the column 23, it is necessary to locate the inking cup 73 in such a way that the stamp 70 may be moistened therein, after which arm 60 is moved towards the lens for marking thereof. The lens, once marked, is removed from the apparatus and held by special clips for location in the bevelling machine. As already indicated hereinbefore, the correct position of the arm 60 is determined by insertion of the guide post 24 in the bushing 67.

For operation of the casting means, rings 31 and 41 are mounted on column 23 and plug 51 is connected to the socket 25*b* of the body. By means of switch 25*a*, the thermostat-heating element system is caused to operate to melt the alloy 45. When the alloy has melted, arm 30 is lowered towards the lens, by means of guide post 24 and bushing 37, until the bosses 39 abut the lens. Thereafter, the metering arm 40 is positioned to pour alloy into member 38 which deposits the metal in the appropriate spot on the lens, where it remains adhered. After a few seconds cooling time, arm 40 is rotated and arm 30 is raised.

The suction cup means operates by mounting arm 80 on column 23 and lowering it to a height of 10 to 12 mm above the lens, after which the end of said arm is subjected to pressure to cause the suction cup 89 to adhere to the lens, said arm being removed thereafter. The arm is guided by guide post 24 and bushing 87.

For operation of the means for providing the lens with a metal holding member without prior melting, ring 91 is located on column 23 and arm 90 is caused to rotate until bushing 92 is received over guide post 24. Then arm 90 is lowered until the block 94 sticks to the adhesive ring member 95, previously applied to the lens, after which block 94 is removed from member 93.

Figure 3:
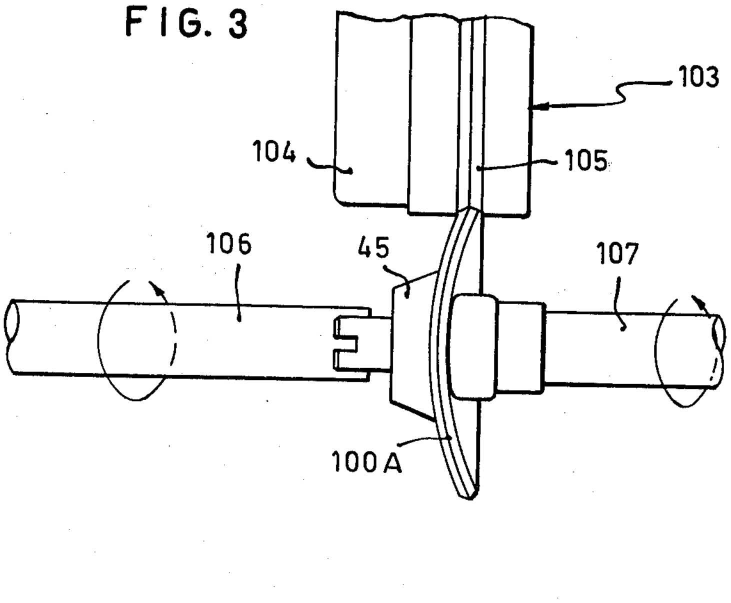
FIG. 3 illustrates the normal placement of a lens for edging and bevelling thereof, in a shaping and/or bevelling machine.

FIG. 3 is a schematic illustration of the bevelling operation of lens 100 in the corresponding bevelling machine, which converts a circular lens 100A into a lens 100B shaped according to front portion 102 of eyeglass frame 101. Bevelling is effected by a double grindstone 103, with a rough grinding area 104 and bevelling area 105. Lens 100A is seen to be held between an alloy holding member 45 and a support felt, each mounted on its corresponding shaft 106 and 107, the latter through a knuckle joint.

What I claim is:

1. Apparatus for the preparation of eyeglass lenses, prior to the shaping and/or bevelling thereof, said preparation consisting of marking or attachment of a holding member to said lens, characterized in that it comprises:
   - a body,
   - a cavity in the upper horizontal surface of said body,
   - an annular member adapted to be located in said cavity and capable of rocking in any direction, said annular member having at least three arms adapted for supporting a lens extending from the upper surface thereof,
   - means for directing a concentrated light beam through the cavity,
   - an upright column attached to said body,
   - an arm mounted for up and down movement to said upright column and having an aperture over said cavity, three bosses extending from the lower face thereof and disposed, preferably, as the apexes of an equilateral triangle, said bosses being adapted to hold the lens together with the arms of the annular member,
   - a spring urging said arm in a downward direction,
   - means for lifting said arm against the urging of said spring,
   - a transparent plate supported by said arm and capable of rotation around said upright column, said plate having a millimeter reticle,
   - means mounted to the arm and to the plate suitable for ensuring a particular relative position between the two,
   - an upright support column and a guide post attached to said body,
   - and interchangeable means for the preparation of a lens prior to shaping thereof mountable on the upright support column and the guide post.

2. Apparatus according to claim 1, characterised in that the interchangeable means for the preparation of a lens prior to shaping thereof comprise an arm having at one end a ring for mounting to the upright support column, a bushing in the centre for receiving the guide post, and means at the other end thereof for structure for effecting the desired operation on the lens, said arm being of such a length that when its ring is located on the upright support column and its bushing is received on the guide post, the other end there is located vertically over the point of the lens where the lens operation is to be performed.

3. Apparatus according to claim 1, wherein said interchangeable means for the preparation of a lens prior to shaping thereof includes structure means for the application of a mark to the lens.

4. Apparatus according to claim 1, wherein said interchangeable means for the preparation of a lens prior to shaping thereof includes structure for holding a lens.

5. Apparatus according to claim 4, wherein said structure for holding a lens further includes apparatus to form a mass of metal alloy for holding said lens.

6. Apparatus according to claim 4, wherein said holding structure includes a suction cup device for holding the lens.

7. Apparatus according to claim 4, wherein the holding structure includes an adhesive ring device attachable to the lens.

* * * * *

UNITED STATES PATENT AND TRADEMARK OFFICE
CERTIFICATE OF CORRECTION

PATENT NO. : 4,169,318

DATED : October 2, 1979

INVENTOR(S) : ANTONIO C. CORTES

It is certified that error appears in the above-identified patent and that said Letters Patent are hereby corrected as shown below:

[73] "Proptis" should be --Proptic--.

Signed and Sealed this

*Eleventh* Day of *March 1980*

[SEAL]

*Attest:*

SIDNEY A. DIAMOND

*Attesting Officer* *Commissioner of Patents and Trademarks*